United States Patent [19]

Cooke et al.

[11] Patent Number: 5,041,161

[45] Date of Patent: Aug. 20, 1991

[54] SEMI-SOLID INK JET AND METHOD OF USING SAME

[75] Inventors: Theodore M. Cooke, Danbury; An-Chung R. Lin, Newtown, both of Conn.

[73] Assignee: Dataproducts Corporation, Woodland Hills, Calif.

[21] Appl. No.: 418,788

[22] Filed: Oct. 3, 1989

Related U.S. Application Data

[63] Continuation of Ser. No. 159,670, Feb. 24, 1988, abandoned.

[51] Int. Cl.$^5$ .................................................. C09D 11/02
[52] U.S. Cl. ........................................ 106/22; 106/23; 106/27; 106/28; 346/1.1
[58] Field of Search ........................ 106/22, 23, 27, 28, 106/32; 346/1.1, 75

[56] References Cited

U.S. PATENT DOCUMENTS

| | | | |
|---|---|---|---|
| 3,653,932 | 4/1972 | Berry et al. | 106/22 |
| 3,715,219 | 2/1973 | Kurz et al. | 106/22 |
| 3,896,249 | 7/1975 | Keeling et al. | 428/202 |
| 4,357,431 | 11/1982 | Murakami et al. | 523/161 |
| 4,361,843 | 11/1982 | Cooke et al. | 346/1.1 |
| 4,386,961 | 6/1983 | Lin | 106/22 |
| 4,390,369 | 6/1983 | Merritt et al. | 106/31 |
| 4,400,215 | 8/1983 | Cooke et al. | 106/22 |
| 4,659,383 | 4/1987 | Lin et al. | 106/27 |

*Primary Examiner*—Amelia Burgess Yarbrough
*Attorney, Agent, or Firm*—Woodcock Washburn Kurtz Mackiewicz & Norris

[57] ABSTRACT

The present invention provides a novel ink jet ink which is semi-solid at room temperature. The subject ink combines the advantageous properties of thermal phase change inks and liquid inks. More particularly, the inks of the present invention comprise vehicles, such as glyceryl esters, polyoxyethylene esters, waxes, fatty acids, and mixtures thereof, which are semi-solid at temperatures between 20° and 45° C. *The ink is impulse jetted at an elevated temperature in the range of above 45° C. to about 110° C., at which temperature the ink has a viscosity of about 10-15 centipose. The subject inks exhibit controlled penetration and spreading, but do not remain on the surface of most substrates where they would be prone to burnishing, cracking or flaking. *These inks further comprise 0.1 to 30 wt. % of a colorant system.

17 Claims, No Drawings

SEMI-SOLID INK JET AND METHOD OF USING SAME

This is a continuation of application Ser. No. 159,670, filed Feb. 24, 1988 abandoned.

CROSS-REFERENCE TO RELATED APPLICATIONS

This application is related to a number of patents and pending applications which have been assigned to the assignee of the present application. These related patents and applications, the disclosures of which are hereby incorporated by reference, are: U.S. Pat. No. 4,390,369 entitled "Natural Wax-Containing Ink Jet Inks", and its continuation Ser. No. 507,918, filed June 27, 1983; U.S. Pat. No. 4,361,843, entitled "Improved Ink Jet Compositions and Methods"; U.S. Pat. No. 4,400,215, entitled "Improved Ink Jet Formulation for Reduced Start-Up Problems", and its continuation application U.S. Ser. No. 522,837, filed Aug. 12, 1983; U.S. Ser. No. 394,154, filed July 1, 1982, entitled "Stearic Acid Containing Ink Jet Inks", now abandoned, and its continuation application, U.S. Ser. No. 565,124, filed Dec. 23, 1983; U.S. Pat. No. 4,386,961, entitled "Heterologous Ink Jet Ink Compositions", and its continuation application, Ser. No. 501,074, filed June 5, 1983; U.S. Ser. No. 668,095, filed Nov. 5, 1984, now abandoned, and its continuation Ser. No. 006,727, filed Jan. 23, 1987; U.S. Ser. No. 672,587, filed Nov. 16, 1984, entitled "Low Corrosion Impulse Ink Jet Ink", now abandoned, and its continuation U.S. Ser. No. 037,062, filed Apr. 13, 1987.

BACKGROUND OF THE INVENTION

The present invention relates to the field of impulse ink jet printing, and more particularly to the field of impulse ink jet inks which are used in printers which contain drop-on-demand impulse ink jet heads. Such printers are normally used with a number of substrates the most common of which are papers of various porosities.

In order to achieve an acceptable print quality, it is known to carefully select the substrate materials to match them to the particular characteristics of the ink which is being jetted. Such careful selection is possible in certain environments, such as in large scale package printing operations, but is not preferred in many environments where there is less control over the selection of the substrate for use with the particular ink. Accordingly, a need exists for impulse ink jet inks which are useful with a wide range of substrates.

Many impulse ink jet inks known to the art are liquid inks. These inks have many advantages. They are easy to store and ship (provided the colorant is readily soluble in the vehicle system), and normally exhibit low viscosities at room temperature, making them quite easy to jet. On the other hand, liquid inks tend to penetrate and spread when jetted onto a porous substrate (such as high rag content bond paper). As a result, it is difficult to achieve letter quality print with liquid impulse ink jet inks without using special substrates. Often the print has a washed out and diffuse appearance. At the present time, liquid impulse ink jet printing systems have achieved only limited acceptance in the general office environment.

It is also known to use inks which are solid at room temperature but which are readily melted for jetting. Many of these inks are described in the above-referenced patent applications and patents. Hot melt inks are referred to, for example, in U.S. Pat. No. 4,490,731 (Vaught). See also U.S. Pat. No. 3,653,932 (Berry); U.S. Pat. No. 3,715,219; and U.S. Pat. No. 4,390,369 (Merritt). These "hot-melt" inks normally comprise vehicles, such as natural waxes, resins and/or long chain fatty acids, esters or alcohols which melt when the ink is heated to jetting temperatures. Upon jetting, heated droplets impact the substrate and immediately freeze on the substrate surface. This phenomenon is advantageous in several respects, in that dark, sharply defined print may be produced. This print may be slightly raised, suggesting that the print is engraved. Since the ink is solid at room temperature, during storage and shipment colorant systems have less of a tendency to separate out of the ink. This has facilitated the use of various colorant systems, such as certain pigment based systems, which would not normally have been used in liquid inks.

There are also known disadvantages to many hot-melt phase change inks. There are certain conditions of use and/or storage where ambient temperatures to which the printed materials are exposed far exceed room temperatures. Papers stored in the trunk of an automobile on a sunny day may, for example, far exceed 100° F. (38° C.). Under such conditions, phase change inks may remelt, causing unwanted adherence to adjacent pages in regions where the original print was raised above the surface of the substrate. Because they are solid at room temperature and tend to be located at the surface of the substrate, they are also prone to burnishing, cracking or flaking. Proper use of hot melt inks therefore requires proper selection of the ink for the intended conditions of use. It is advantageous to select the substrate and jetting conditions to obtain some degree of ink penetration while achieving desirable print characteristics.

Notwithstanding the substantial advances achieved in the development of ink jet inks for use with drop on demand printers, a need still exists for inks which will produce dark, clearly defined print on a wide range of substrates and which will not crack, smear, flake off or burnish.

The present invention provides a novel ink jet printing methods which utilizes semi-solid inks. These inks are to be distinguished from those which may contain one or more components which may be semi-solid at room temperature but which, in the proportions or combinations used in the subject inks, do not result in inks which are semi-solid at room temperature. For example, U.S. Pat. No. 4,357,431 discloses an ink comprising a polymeric substance selected from a group consisting of polyisobutylene and ethylene-propylene copolymer, a wax which is solid or semi-solid at room temperature, pigment particles and a low-boiling solvent having a boiling point lower that 200 degrees C. The resulting composition, which is intended for use as an ink in ball point pens, has a relatively low viscosity ("preferably in a range of 500 to 1500 poises").

SUMMARY OF THE INVENTION

The present invention provides a novel drop on demand printing method utilizing ink jet ink which is semi-solid at room temperatures. The subject ink combines the advantageous properties of thermal phase change inks and liquid inks. More particularly, the inks of the present invention comprise vehicles, such as glyceryl esters, polyoxyethelence esters, waxes such as candelilla or petrolatum, fatty acids, and mixtures thereof, which are semi-solid at temperatures between 20°-45° C. These inks further comprise 0.1 to 30 wt % of a colorant system. The ink is impulse jetted at an elevated temperature in the range of from above 45° to about 110° C., at which the ink has a viscosity of about 10-15 centipoise. The subject inks exhibit controlled penetration and spreading, but do not remain on the surface of most substrates where they would be prone to burnishing, cracking or flaking.

Accordingly, a primary object of the present invention is the provision of a novel drop on demand printing method.

Another object of the present invention is the provision of novel inks for use in the drop on demand printing methods of this invention.

A further object of the present invention is the provision of novel printed material produced in accordance with the printing methods of this invention.

These and other objects of the present invention will become apparent from the following, more detailed description.

DETAILED DESCRIPTION OF THE INVENTION

The present invention provides a novel method of drop on demand printing for use with drop on demand (impulse) ink jet printers. Such printers are widely known to the art. These printers jet ink by ejecting drops, individually or in bursts, upon demand. This is usually accomplished by providing a piezoelectric print head which receives ink from a supply. This method is to be distinguished from other jet printing methods which substantially continuously jet drops, some or all of which are deflected electrostatically.

The present invention employs novel inks which comprise semi-solid vehicles. A semi-solid can be defined as a material which demonstrates the phenomenon of creep. Creep is the permanent or semipermanent deformation underload of a material at a specific temperature. Typical materials which show "creep" are plastics, thermoplastics, grease and glass. A semisolid can also be defined by the degree to which the material resists penetration under a force, the degree of penetration indicating the rigidity of the material. Still another method for defining a semi-solid is by its viscosity. As used herein, the term "semi-solid" refers to materials which have viscosities at room temperature in excess of 6000 centipoise and less than 1,000,000 centipoise. Preferably the semi-solid materials of the present invention have viscosities at room temperature in excess of 10,000 centipoise.

The vehicles of the present invention may be selected from any of a variety of organic materials which otherwise are stable, compatible with the selected colorant system, jettable when formulated in the subject ink and elevated to jetting temperatures, and which produce suitable print. Examples of such materials include glyceryl esters, polyoxyethylene esters, waxes such as candelilla or petrolatum, fatty acids, and mixtures thereof.

In the preferred embodiment of the present invention, the ink comprises 70 to 99.9 wt % of a vehicle which is semi-solid at a temperature between 20°-45° C. and 0.1 to 30 wt % of a colorant system.

A variety of compatible colorant systems known to the art may be used in the ink of this invention. Such systems include a variety of dyes or pigments, such as Typophor Black, oil dispersed graphite, nigrosine, etc. Examples of such colorant systems are set forth in the above-referenced patents and applications which have been incorporated by reference herein. Some of these colorant systems may comprise solvents or other liquids which are volatile at room temperature. The purpose of these solvents is normally to disperse or dissolve the dye or pigment in the system. When such colorant systems are used in accordance with this invention, they should not be used in quantities which lower the viscosity of the resulting inks to below 6000 cps at room temperature. Some limited degree of evaporation of such solvents may enhance the qualities of the preferred inks, however, by enhancing initial penetration and spreading before rapid evaporation to leave the generally solid or semi-solid colorant and the semi-solid vehicle.

Certain glyceryl esters are preferred vehicles for use in formulating inks of the present invention. Glyceryl mono laurate which is commercially available under the trade name "Aldo MLD" is the presently preferred glyceryl ester. This ester is described as a "soft solid" by its manufacturer, and is listed as having a melting or solidification point of 21°-26° C. Glyceryl mono laurate is typical of the preferred semi-solids for use in the present invention in that it does not have a distinct melting or freezing point, solidifying over a temperature range of 3 to 10, preferably 4-7, degrees Centigrade at temperatures within 15, preferably 10, most preferably 5 degrees Centigrade of room temperature (25 degrees Centigrade).

Other glyceryl esters meeting the above requirements are also anticipated to be useful in inks of the present invention. For example, glyceryl mono cocoate (sold as ALDO MC), is also a soft solid at 25° C., and has a melting or solidification "point" between 20 to 26 degrees Centigrade. Glyceryl mono oleate (sold as ALDO MO), a soft solid listed as having a melting or solidification "point" below 25 degrees C and its corresponding technical grade (sold as ALDO MO TECH.) are also expected to be suitable for use in formulating inks of the present invention. Finally, glyceryl mono stearate is also expected to be a useful vehicle in the inks of this invention.

Certain polyethylene glycol (polyoxyethylene) esters which otherwise meet the requirements of the present invention are also useful in formulating inks of the present invention. The preferred polyethylene glycol ester is polyethylene glycol 1500 mono stearate (sold as Pegosperse 1500 MS), which is described by its manufacture as a "waxy solid" at 25 degrees Centigrade and which is listed as having a melting or solidification "point" of 27-31 degrees Centigrade. Polyethylene glycol 1500 dioleate (sold as Pegosperse 1500 DO), which has a melting or solidification "point" of 30-38 degrees Centigrade is also believed to be useful in making inks for use in accordance with the herein described printing methods.

Certain waxes which are semi-solid at room temperature may also be used as a vehicle in the subject invention. Petrolatum can be used but is not particularly preferred compared to the other semi-solid materials described herein. It is presently thought that petrolatum behaves too much like a liquid to achieve the nonspreading characteristics desired when used on most substrates. Another wax, candelilla, has been successfully used as a component of the vehicle, e.g., when mixed with a fatty acid or, preferably, with a glyceryl ester such as glycerol mono laurate.

Fatty acids are also suitable for use as the vehicles in the subject invention. These acids may be saturated or unsaturated and may have from eight to twenty-two carbon atoms, preferably about 12 to 18 carbon atoms. Examples of suitable fatty acids include but are not limited to lauric acid and oleic acid.

These vehicles, when formulated into the desired inks, possess desirable properties of both liquid and solid inks when jetted. When these inks impact a substrate, they do not freeze into a solid which remains on the surface. When the substrate is porous, such as a paper, these semi-solids will migrate into the fibers where they will become absorbed. On the other hand, the ink migration of the herein described semi-solid inks differ in character from that of conventional liquid inks because the semi-solid inks of this invention will resist lateral spreading prior to absorbtion. Furthermore, since the inks of the present invention do not contain appreciable amounts of solvents (other than those required, if any, in the colorant system) they are less prone to viscosity changes when the printing unit is operating in the heated "standby" mode.

The present invention will further be understood from the inks listed in the examples of Table I, each of which were found to produce suitable print when jetted at temperatures in the range of above 45 to about 110 degrees Centigrade, preferably 50 to 60 degrees Centigrade, to provide an ink having a viscosity upon jetting of 10 to 15 cps.

TABLE I

| Composition | Weight % | | | | |
|---|---|---|---|---|---|
| | A | B | C | D | E |
| Petrolatum | 99.5 | — | — | — | — |
| Glycerol Mono Laureate | — | 85 | 70 | — | 95 |
| Polyethylene Glycol 1500 Mono Stearate | — | — | — | 85 | — |
| Typophor Black | — | 10 | 30 | 10 | — |
| Oil Dispersed Graphite | — | 5 | — | 5 | 5 |
| Dye | 0.5 | — | — | — | — |

| Composition | Weight % | | | |
|---|---|---|---|---|
| | F | G | H | I |
| Lauric Acid | — | — | — | 90 |
| Glycerol Mono Laureate | 60 | — | 70 | — |
| Oleic Acid | — | 25 | 21 | — |
| Candelilla | 25 | 60 | — | — |
| Oil Dispersed Graphite | 5 | 5 | — | — |
| Typophor Black | 10 | 10 | — | — |
| Nigrosine Base DSA | — | — | 9 | 10 |
| Viscosity (cps) | | | | |
| @ 100° C. | 12.7 | 11.5 | — | 7.7 (80° C.) |
| @ 120° C. | 8.5 | 8.0 | — | 6.5 (90° C.) |

Each of samples A-I were prepared and jetted from an impulse ink jet apparatus on a Hammer mill bond, and each was suitable for jetting. In some instances, where the jetting temperatures were high and the substrates porous, undesirable diffusion (spreading) of the ink was noticed, however reduction in the jetting temperature should reduce this effect with most substrates. Spreading of the petrolatum ink was judged unacceptable for most applications. Sample F provided the best print when jetted from a hot melt print apparatus, although it was somewhat prone to smearing as tested.

From the above, those of ordinary skill in the art will recognize that various departures can be made from the materials and methods described in this application without departing from the scope thereof, which is more particularly defined in the claims appended hereto. For example, those of ordinary skill in this art will appreciate that the primary object of this invention is to provide an ink which is itself semi-solid at a temperature in the range of 20 to 35 degrees Centigrade, and that other materials and material mixtures could accomplish this desired result and achieve the objectives of this invention, provided those materials and the resulting ink which utilizes them satisfy the other requirements set forth in this disclosure.

A novel ink jet ink and printing method are thus disclosed which possess certain advantages over prior art liquid and hot melt drop on demand inks and methods for using them.

We claim:

1. A method of ink jet printing comprising the steps of:
   (a) providing an ink consisting essentially of
      (i) 70 to 99.9 wt. % of a vehicle which is semi-solid at a temperature between 20° and 45° C., said vehicle being selected from the group consisting of glyceryl esters, polyoxyethylene esters, mixtures thereof, and mixtures of one or more glyceryl esters and a minor proportion of wax;
      (ii) 0.1 to 30 wt. % of a colorant system, said ink being a semi-solid at a temperature between 20° and 45° C.;
   (b) elevating the temperature of said ink to a temperature in the range of about 45° C. to about 110° C.; and
   (c) jetting said ink onto a substrate whereupon said ink migrates into and into and is absorbed into said substrate.

2. The method of claim 1 wherein said vehicle is selected to have a viscosity at 25 degrees Centigrade greater than 6000 cps.

3. The method of claim 2 wherein said vehicle is selected to have a viscosity at 25 degrees Centigrade of greater than 10,000 cps.

4. The method of claim 3 wherein said vehicle is selected to have a viscosity at 25 degrees Centigrade of less than 1,000,000 cps.

5. The method of claim 1 wherein said vehicle is selected to melt over a range of at least 3 degrees Centigrade.

6. The method of claim 5 wherein said vehicle is selected to melt over a range of no more than 10 degrees Centigrade.

7. The method of claim 5 wherein said vehicle is selected to melt over a range of four to seven degrees Centigrade.

8. The method of claim 5 wherein said range of melting of said vehicle is selected to occur within the range of about 15 to 45 degrees Centigrade.

9. The method of claim 8 wherein said range of melting of said vehicle is selected to occur within the range of about 15 to 35 degrees Centigrade.

10. The method of claim 9 wherein said range of melting of said vehicle is selected to occur within the range of about 20 to 30 degrees Centigrade.

11. The method of claim 1 wherein the ink is formulated to have a viscosity at room temperature of at least 6000 cps.

12. The method of claim 1 wherein the temperature of said ink is elevated to between 50 and 60 degrees Centigrade.

13. The method of claim 1 wherein the temperature of said ink is elevated until it has a viscosity for jetting of between 10 to 15 cps.

14. The method of claim 1 wherein said vehicle is selected to consist essentially of a polyoxyethylene ester.

15. The method of claim 1 wherein said vehicle is selected to consist essentially of a glyceryl ester.

16. The method of claim 1 where said vehicle is selected to comprise a mixture of one or more glyceryl esters and a minor proportion of wax.

17. A method of ink jet printing comprising the steps of:
   (a) providing an ink consisting essentially of
   (i) 70 to 99.9 wt. % of a vehicle which is semi-solid at a temperature between 20° and 45° C., said vehicle being selected from the group consisting of glyceryl esters, polyoxyethylene esters, lauric acid, mixtures thereof, and mixtures of glyceryl esters with minor proportions of wax;
   (ii) 0.1 to 30 wt. % of a colorant system, said ink being a semi-solid at a temperature between 20° and 45° C.;
   (b) elevating the temperatures of said ink to a temperature in the range of above 45° C. to about 110° C.; and
   (c) jetting said ink onto a substrate whereupon said ink migrates into and is absorbed into said substrate.

* * * * *